Patented Nov. 7, 1950

2,528,655

UNITED STATES PATENT OFFICE 2,528,655

1-ACYLOXY-4,7- METHANO -3a,4,7,7a-TETRA-HYDRO-4,5,6,7,8,8 - HEXACHLOROINDENES AND METHOD OF PRODUCING THE SAME

Simon H. Herzfeld and Eugene P. Ordas, Chicago, Ill., assignors to Velsicol Corporation, Chicago, Ill., a corporation of Illinois No Drawing. Application July 22, 1948, Serial No. 40,155

10 Claims. (Cl. 260—488)

1

This application is a continuation-in-part of our co-pending application, Serial No. 735,526, filed March 18, 1947, now abandoned.

This invention relates to the production of new and useful compositions of matter.

More specifically, this invention is concerned with new compositions of matter generally defined as acyloxy derivatives of the adduct of hexachlorocyclopentadiene and cyclopentadiene, and to the method of production thereof.

The Diels-Alder reaction of hexahalocyclopentadienes with cyclopentadiene has been disclosed in the co-pending application of Herzfeld, Lidov and Bluestone, Serial No. 581,172, filed March 5, 1945, and is symbolized as follows:

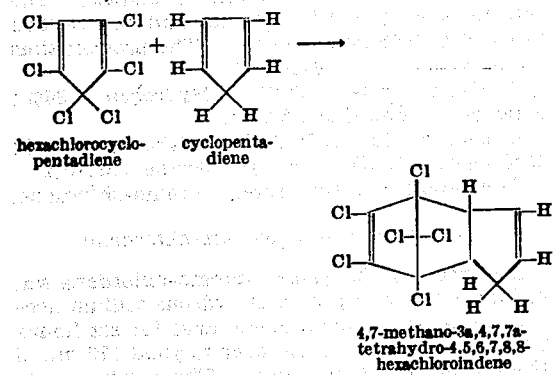

According to "The Ring Index" by Patterson and Capell, A. C. S. Monograph Series, No. 84, 1940, dicyclopentadiene, C10H12, is described as 4,7 - methano-3a,4,7,7a - tetrahydroindene. Following this accepted system of nomenclature, the adduct of hexachlorocyclopentadiene and cyclopentadiene would be described as 4,7-methano-3a,4,7,7a-tetrahydro-4,5,6,7,8,8-hexachloroindene. Hereinafter, for the purpose of brevity, this compound will be referred to as chlordene.

The compounds with which this present invention is concerned as the 1-acyloxy-derivatives of chlordene, represented by the formula:

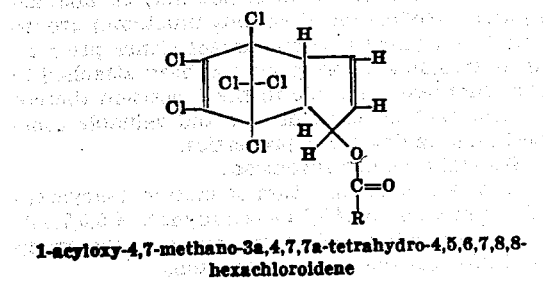

1-acyloxy-4,7-methano-3a,4,7,7a-tetrahydro-4,5,6,7,8,8-hexachloroidene

2

The nature of "R" in the formula above will be more fully explained hereinafter.

1-acyloxy-chlordene may be prepared from chlordene in accordance with the present invention by preparing the 1-bromo-derivative of chlordene and subsequently replacing the bromine atom of said derivative with an acyloxy group, all as more fully explained hereinafter.

The formation of 1-bromo-chlordene is dependent upon the fact that in the present of peroxides, bromine reacts with chlordene by substitution at the free methylene group. Small amounst of peroxides are normally contained in the reactants, but to insure a sufficient quantity it is preferable to add organic peroxides such as benzoyl peroxide, lauryl peroxide, or ascaridol, in the ratio of about 0.001 to 0.01 mol peroxide per mol of chlordene. A mol of bromine, or preferably a slight excess thereof should be used per mol of chlordene; however, the ratio of these reactants can be varied over a very wide range and any preference is based on economic rather than technical reasons. Bromination is accomplished by reacting liquid bromine, preferably contained in a relatively inert solvent such as carbon tetrachloride, chloroform, carbon disulfide, tetrachloroethylene, or the like, with chlordene contained in a solvent and in the presence of a peroxide as aforesaid. For effective reaction, the bromine may be added to the chlordene in the manner illustrated in the subsequent example. The time required for the reaction to proceed to completion, that is, when either or both of the reactants are completely used up, will depend on the concentration of reactants, temperature, agitation and those other factors normally affecting reaction rates. It is not necessary that the reaction be completed, or that such reaction be terminated at completion, but large excesses of time should be avoided to minimize the formation of side products. The time when the reaction starts, the approximate rate of reaction, and the time when the reaction is completed can be estimated by the rate and duration of time that hydrogen bromide is generated from the reaction mixture. The reaction will proceed to result in the formation of 1-bromo-chlordene over fairly broad ranges of temperature, such as, for example, between about 15-18° C. Reaction temperatures between about room temperature or slightly above to about 120° C. are very satisfactory, and good yields of product can be obtained at a reasonably rapid rate at temperatures of about 45° C. to 65° C. The reaction temperature can generally be adequately controlled by controlling the rate of introduction of bromine to the reaction mixture; however, external cooling or heating means can be utilized if desired. When the reaction is completed, or is otherwise abated after product is formed, the 1-bromo-chlordene can be isolated by vacuum fractionation or any other method well known to the art. The reaction is almost quantitative, and yields of over 90 per cent based on the theoretical amount can be obtained.

Esterification of 1-bromo-chlordene to result in 1-acyloxy-chlordene may be accomplished by treating said bromo compound for from about one-half to about twenty hours or longer, depending upon the nature and concentration of reactants and the temperature employed, with the salt of an organic acid, such as the sodium, potassium or silver salt of organic carboxylic acids having up to about twenty carbon atoms per molecule including such acids as acetic, propionic, butyric, valeric, benzoic, acrylic, butenoic, pentenoic, teracrylic, cinnamic, lauric, elaidic, and similar type acids.

The reaction between the sodium salt of the acid above defined and 1-bromo-chlordene is carried out in the presence of a relatively inert solvent preferably capable of dissolving the reactants substantially completely, such as ethylene glycol, carbitol, propionic acid, dioxane, glacial acetic acid or the free acid of the salt used as a reactant. The reaction temperature may vary within a fairly broad range, such as from about normal room temperature to about 170° C., although it should not be so low as to cause the reaction to proceed at an inconveniently slow rate, nor so high as to decompose the reactants or the product. A satisfactory, though not necessarily limiting, temperature range is from about 80 to about 150° C. It is convenient to carry out the reaction at the reflux temperature of the solvent employed thereby eliminating the necessity for close temperature control, and thus, the use of a solvent boiling within the aforementioned temperature range is preferred. The ratio of reactants is not critical although a stoichiometric amount or an excess of the salt reactant is preferred to insure a maximum utilization of the bromo compound and conversion thereof to 1-acyloxy-chlordene. The amount of solvent utilized is also not critical, although a sufficiency thereof to dissolve the reactants and the product is preferred. Large excesses of solvent should be avoided because of the dilution effect on the rate of the reaction. The solvent may be removed from the reaction product by distillation, at reduced pressures if necessary, and the residue, comprising the acyloxy derivative of chlordene, can be purified to obtain pure 1-acyloxy-chlordene. Purification may be accomplished by distillation in vacuo, by crystallization from suitable solvents, by preferential adsorption on porous materials, or by any other means known to the art.

The 1-acyloxy-chlordene, thus obtained, has a structural formula and chemical name as previously represented. The nature of "R" in said structure is, of course, determined by the acid portion of the salt reactant utilized. Thus, where a salt of acetic acid is utilized, "R" would be a methyl group; where a salt of benzoic acid is utilized, "R" would be a phenyl group; where a salt of propionic acid is utilized, "R" would be an ethyl group; it is thus seen that "R" represents the acid portion of the salt reactant utilized less the carboxyl group of the acid. As previously stated, the acid utilized may have up to about twenty carbon atoms, and thus, "R" will be an organic radical containing less than twenty carbon atoms. In the case where a formate salt reactant is utilized, "R" will be a hydrogen atom. Where "R" is a methyl group, the compound of the present invention would be named 1-acetoxy-4,7-methano - 3a,4,7,7a - tetrahydro - 4,5,6,7,8,8-hexachloroindene. In a similar manner, depending on the nature of "R," the name of the specific compound can be formulated in accordance with the rules of nomenclature.

The following is a specific example of the method of our invention for the purpose of illustration:

*Preparation of 1-bromo-chlordene*

A solution containing 1 mol (339 grams) chlordene and 5 grams lauryl peroxide in 800 ml. carbon tetrachloride was placed into a 2-liter 3-necked flask equipped with a reflux condenser, mechanical stirrer, thermometer and dropping funnel. This solution of chlordene was warmed to 50–55° C. and a bromine solution consisting of 176 grams bromine in 200 ml. carbon tetrachloride was introduced with a slow rate of stirring. The addition of the bromine solution was carried out at such rate as to maintain the temperature of the reaction vessel at 55° C. After addition was completed, the solution was refluxed for one-half hour to insure complete reaction. The reaction mixture was then washed with an excess of sodium bisulfite solution, washed with water, and dried in succession with calcium chloride and anhydrous magnesium sulfate. The solvent was removed in vacuo and the residue distilled at 0.05 mm. pressure. The product thus obtained boiled at 130–132° C.

Analysis: Carbon, 27.64%; Hydrogen, 1.36%; Halogen (as chlorine), 59.75%.

Calculated for $C_{10}H_5Cl_6Br$: Carbon, 28.74%; Hydrogen, 1.21; Halogen (as chlorine), 59.40%.

The product is, therefore, 1-bromo-chlordene.

*Preparation of 1-acetoxy-chlordene*

A mixture of 60 grams 1-bromo-chlordene was refluxed with 35.4 grams anhydrous sodium acetate in 180 ml. glacial acetic acid for six hours. The solvent was distilled over to yield 170 ml. of the glacial acetic acid used. The residue, comprising 1-acetoxy-chlordene was dissolved in benzene (200 ml.) and the extract was filtered. The solvent was then removed from the filtrate at reduced pressure and the 1-acetoxy-chlordene was purified by recrystallization from a benzene-petroleum ether mixture.

The compounds of this invention are useful as insecticides or intermediates in the preparation of insecticides, fungicides, and the like. Thus, the acyloxy group of the compounds of this invention may be replaced with a halogen atom to result in a very potent insecticide. Further, the compounds of this invention may be modified by the introduction of various functional groups into the acyloxy portion thereof either prior to, or after, said acyloxy group has been attached to the chlordene molecule in the 1 position thereof as aforesaid to result in new and valuable compositions having toxic properties.

We claim as our invention:

1. As a new composition of matter, 1-acyloxy-4,7 - methano - 3a,4,7,7a - tetrahydro - 4,5,6,7,8,8-hexachloroindene wherein said acyloxy group contains less than 21 carbon atoms.

2. A new composition of matter comprising 1-acetoxy-4,7-methano-3a,4,7,7a-tetrahydro-4,5,6,7,8,8-hexachloroindene.

3. The method which comprises reacting 4,7-methano-3a,4,7,7a-tetrahydro-4,5,6,7,8,8-hexachloroindene with bromine in the presence of a relatively inert solvent and an organic peroxide to form 1-bromo-4,7-methano-3a,4,7,7a-tetrahydro-4,5,6,7,8,8-hexachloroindene, and esterifying said bromo compound to produce 1-acyloxy-4,7-methano-3a,4,7,7a-tetrahydro-4,5,6,7,8,8-hexachloroindene.

4. The method which comprises reacting the Diels-Alder adduct of hexachlorocyclopentadiene and cyclopentadiene with bromine in the presence of a relatively inert solvent and an organic peroxide to form 1-bromo-4,7-methano-3a,4,7,7a-tetrahydro-4,5,6,7,8,8-hexachloroindene, and reacting said bromo compound with the metal salt of an organic carboxylic acid containing less than 21 carbon atoms to produce 1-acyloxy-4,7-methano-3a,4,7,7a-tetrahydro-4,5,6,7,8,8-hexachloroindene.

5. The method which comprises reacting 4,7-methano-3a,4,7,7a-tetrahydro-4,5,6,7,8,8-hexachloroindene with bromine in the presence of a peroxide and a relatively inert solvent to form 1-bromo-4,7-methano-3a,4,7,7a-tetrahydro-4,5,6,7,8,8-hexachloroindene, and esterifying said bromo compound by reacting it with the metal salt of an organic carboxylic acid containing less than 21 carbon atoms in the presence of a relatively inert solvent to produce 1-acyloxy-4,7-methano-3a,4,7,7a-tetrahydro-4,5,6,7,8,8-hexachloroindene.

6. The method which comprises esterifying 1-bromo-4,7-methano-3a,4,7,7a-tetrahydro-4,5,6,7,8,8-hexachloroindene by reacting it with the metal salt of an organic carboxylic acid containing less than 21 carbon atoms in the presence of a relatively inert solvent to produce 1-acyloxy-4,7-methano-3a,4,7,7a-tetrahydro-4,5,6,7,8,8-hexachloroindene.

7. A new composition of matter comprising 1-formyloxy-4,7-methano-3a,4,7,7a-tetrahydro-4,5,6,7,8,8-hexachloroindene.

8. A new composition of matter comprising 1-benzoyloxy-4,7-methano-3a,4,7,7a-tetrahydro-4,5,6,7,8,8-hexachloroindene.

9. A new composition of matter comprising 1-acryloyloxy-4,7-methano-3a,4,7,7a-tetrahydro-4,5,6,7,8,8-hexachloroindene.

10. A new composition of matter comprising 1-lauroyloxy-4,7-methano-3a,4,7,7a-tetrahydro-4,5,6,7,8,8-hexachloroindene.

SIMON H. HERZFELD.
EUGENE P. ORDAS.

No references cited.

Certificate of Correction

Patent No. 2,528,655                                                               November 7, 1950

SIMON H. HERZFELD ET AL.

It is hereby certified that error appears in the printed specification of the above numbered patent requiring correction as follows:

Column 2, line 49, for "15–18° C." read *15–180° C.*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*